United States Patent
Callison et al.

(10) Patent No.: US 12,088,132 B2
(45) Date of Patent: Sep. 10, 2024

(54) METHOD AND APPARATUS FOR EXTENDING SUBSTATION BATTERY LIFE

(71) Applicant: Commonwealth Associates, Inc., Jackson, MI (US)

(72) Inventors: Gerald Robert Callison, Chelsea, MI (US); Sebastien Christophe Billaut, Lake Mary, FL (US)

(73) Assignee: Commonwealth Associates, Inc.

( * ) Notice: Subject to any disclaimer, the term of this patent is extended or adjusted under 35 U.S.C. 154(b) by 18 days.

(21) Appl. No.: 17/878,553

(22) Filed: Aug. 1, 2022

(65) Prior Publication Data

US 2024/0039309 A1 Feb. 1, 2024

(51) Int. Cl.
| | |
|---|---|
| H02J 1/10 | (2006.01) |
| H02J 7/00 | (2006.01) |
| H02J 7/02 | (2016.01) |
| H02J 7/34 | (2006.01) |

(52) U.S. Cl.
CPC ............ *H02J 7/0032* (2013.01); *H02J 1/106* (2020.01); *H02J 7/0013* (2013.01); *H02J 7/0063* (2013.01); *H02J 7/02* (2013.01); *H02J 7/34* (2013.01)

(58) Field of Classification Search
CPC ........ H02J 7/0032; H02J 1/106; H02J 7/0013; H02J 7/0063; H02J 7/02; H02J 7/34
See application file for complete search history.

(56) References Cited

U.S. PATENT DOCUMENTS

| | | |
|---|---|---|
| 4,718,079 A | 1/1988 | Rabito |
| 9,041,354 B2 | 5/2015 | Lee |
| 10,033,194 B2 | 7/2018 | Hagström |
| 10,228,424 B2 | 3/2019 | Hindle |
| 10,536,011 B2 | 1/2020 | Shlemenzon |
| 10,974,606 B2 | 4/2021 | Dulle |
| 2011/0140648 A1* | 6/2011 | Lee ........................ H02J 7/34 307/66 |
| 2021/0200176 A1 | 7/2021 | Chaoua |

\* cited by examiner

*Primary Examiner* — Lincoln D Donovan
*Assistant Examiner* — Alex W Lam
(74) *Attorney, Agent, or Firm* — Gunther J. Evanina; BUTZEL LONG

(57) ABSTRACT

Systems and methods for extending battery backup power to an electrical substation include or utilize a latching direct current contactor having a current input and a current output, and a controller configured to monitor all alternating current inputs to an electrical substation, and to trip the latching direct current contactor when all alternating current inputs and auxiliary power to the electrical substation are dead, whereby direct current does not flow through the latching direct current contactor when supplied loads in the substation, such as relaying and communications, are not needed, and to close the latching direct current contactor when at least one alternating current input or auxiliary power is live, whereby direct current flows through the latching direct current contactor when the direct current supplied loads are needed.

11 Claims, 3 Drawing Sheets

METHOD AND APPARATUS FOR EXTENDING SUBSTATION BATTERY LIFE

FIELD OF THE DISCLOSURE

This disclosure pertains to improved electrical substations, and more particularly to hardware and methods for significantly increasing the emergency battery life at substations during a power outage.

BACKGROUND OF THE DISCLOSURE

When substations lose their low voltage auxiliary alternating current (AC) power during unexpected faults, transient conditions, or planned outages, direct current (DC) loads, such as protective relays and control equipment, are powered by substation batteries. Batteries ensure customers remain in-service and the station can still be monitored and operated safely during these periods. Industry standard practice involves sizing these batteries for an 8-hour window of relay operation and ensures the battery-powered equipment can operate for at least one occurrence of the worst-case momentary demand (i.e., most power intensive) while accounting for an aging-coefficient. Currently, if the outage of the substation lasts more than the typical 8 hours, then either onsite auxiliary generators or mobile batteries must be provided to power the station until the auxiliary AC supply becomes available again.

A typical substation configuration 10 is shown in FIG. 1. Relays and circuit breaker tripping and closing are powered by a direct current system in a typical substation. During normal operation, this DC system is powered by battery chargers 12, 13 which receive their power from the substation's auxiliary AC supply 14. When this AC supply, and thus also the DC chargers, are lost, the DC is provided by a battery 16. These batteries also provide the high momentary currents, associated with breaker tripping and closing, that exceed the amount of current that chargers are able to provide. These batteries are usually Lead-Selenium or Lead-Calcium variations of the Vented Lead Acid type (also known as "wet" or "flooded").

A direct current distribution cabinet 18 distributes direct current from the battery chargers 12, 13 and battery 16 to relay panels 20, 21 that contain direct current load devices such as protective relays, communications equipment, and circuit breakers. While most new substations feed these direct current loads through cables connecting them to a load panel, some older substations feature a current carrying metal bars, called a bus, that distributes the direct current to individual panels where the loads that need it are located.

These batteries are typically sized to handle the entire continuous DC load of the substation, including relays, station computers, and telecommunications equipment, for 8 hours, along with at least one occurrence of the worst momentary current, consisting of breakers tripping or closing. Relays still operate off the battery even if they are not needed, such as would occur if all power lines into a substation were dead, and thus no portion of the substation was energized and there is nothing for the relays to protect.

Current substation owner practice is to bring in an alternative source of power for an outage of a substation's alternating current supply (and thus direct current chargers) that will last more than the typical time (e.g., 8 hours) for which the batteries are sized to backup the station. This alternative source of power is typically a mobile generator or battery truck. During events, like extreme weather, that take many substations completely offline, the need for such alternative sources of power can stretch both the availability of equipment and manpower. If unnecessary relaying when the substation is completely offline could be eliminated, substation battery life could be increased and the need for an alternate power source could be avoided at times when the equipment and manpower are in short supply.

SUMMARY OF THE DISCLOSURE

Disclosed are systems for extending battery life of a battery powering direct current loads panel at an electrical substation. The system provides a latching direct current contactor that is located to isolate the battery from a direct current load panel, and a controller for controlling the latching direct current contactor depending on the status of alternating current input(s) to the electrical substation.

Also discussed are electrical substations employing the described systems for extending battery life, and methods of extending battery life at an electrical substation using the described systems for extending battery life.

DETAILED DESCRIPTION

Figure 1:
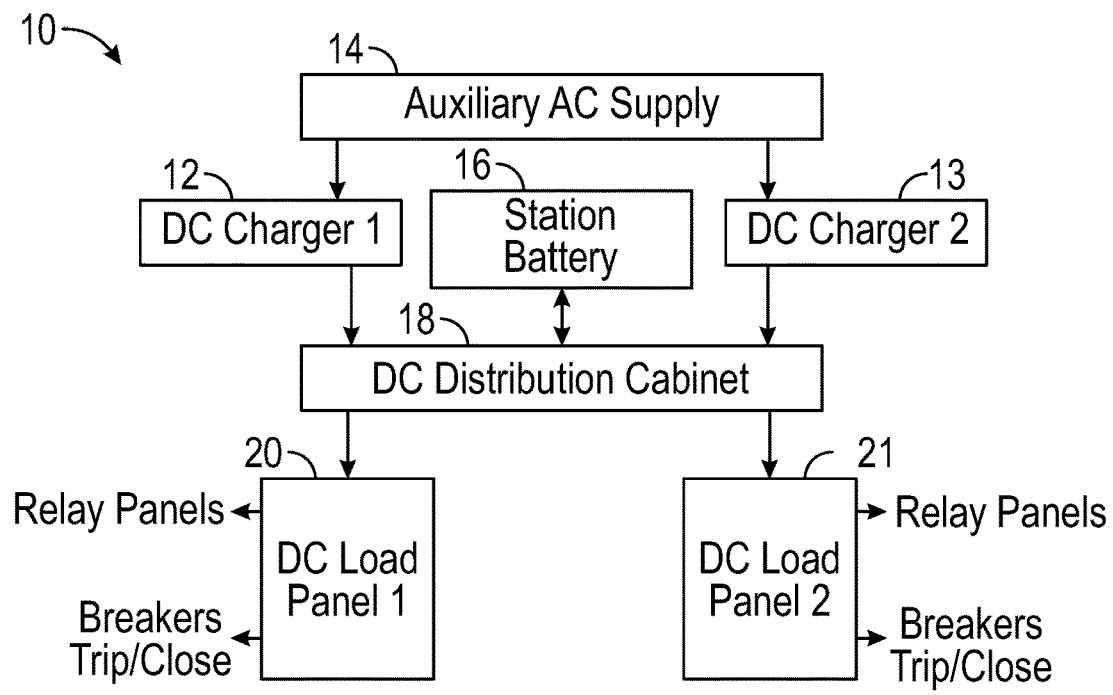
FIG. 1 is a typical layout of a one battery, two charger systems for substation DC supply.
Figure 2:
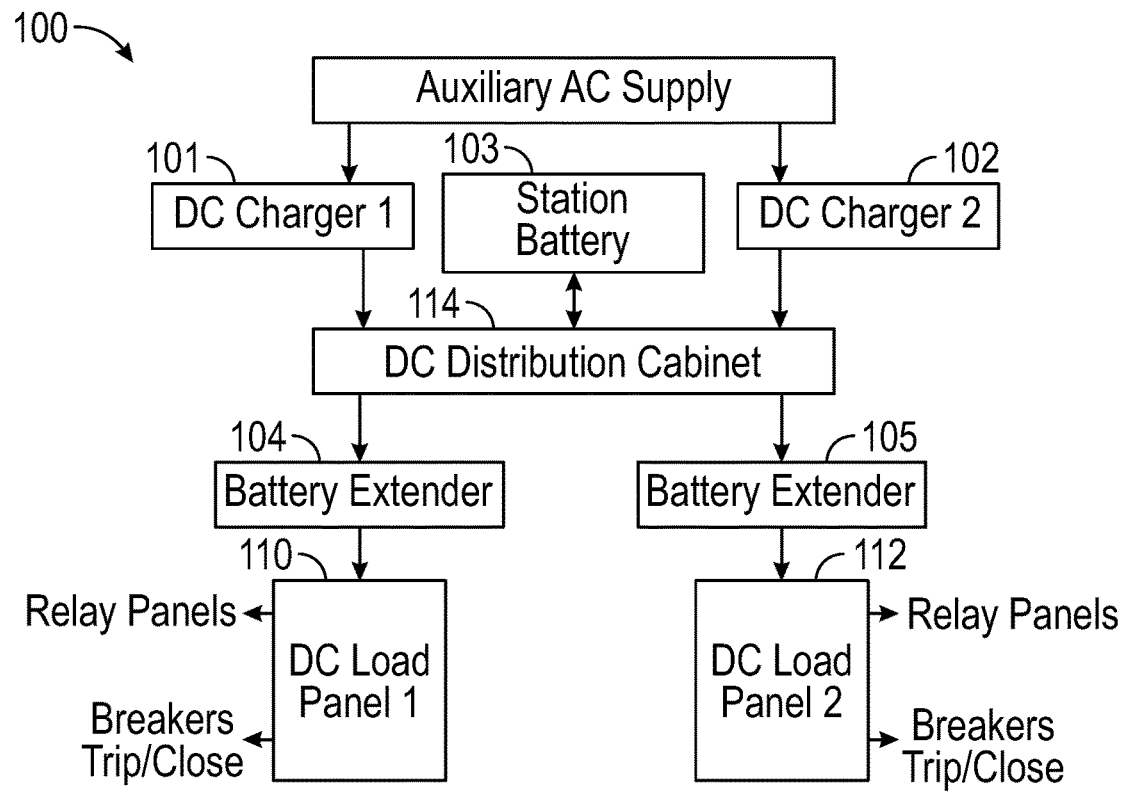
FIG. 2 represents a typical layout of a dual charger, single battery DC auxiliary system of a substation, and shows where the battery extender would be located.

FIG. 2 represents a typical layout of a dual charger 101, 102, single battery 103 DC auxiliary system 100 of a substation, and shows where the battery extender 104, 105 (i.e., system for extending battery life of a battery powering a direct current load panel) would be located. The battery extender is positioned to isolate the DC load panels 110, 112 (which supplies loads such as protective relays, communications equipment, and circuit breakers) from both the station's batteries and chargers. This is because a substation should not be operated with its DC supplied only by its chargers, as batteries supply the large momentary currents that occur with breaker tripping and closing, which most chargers are incapable of supplying. A direct current distribution cabinet 114 distributes direct current from chargers 101, 102 and batteries 103 to the direct current load panels 110, 112.

Battery 103 can include any number of cells connected in series, in parallel, or both, and can include two or more batteries that can be selected as alternatives.

Figure 3:
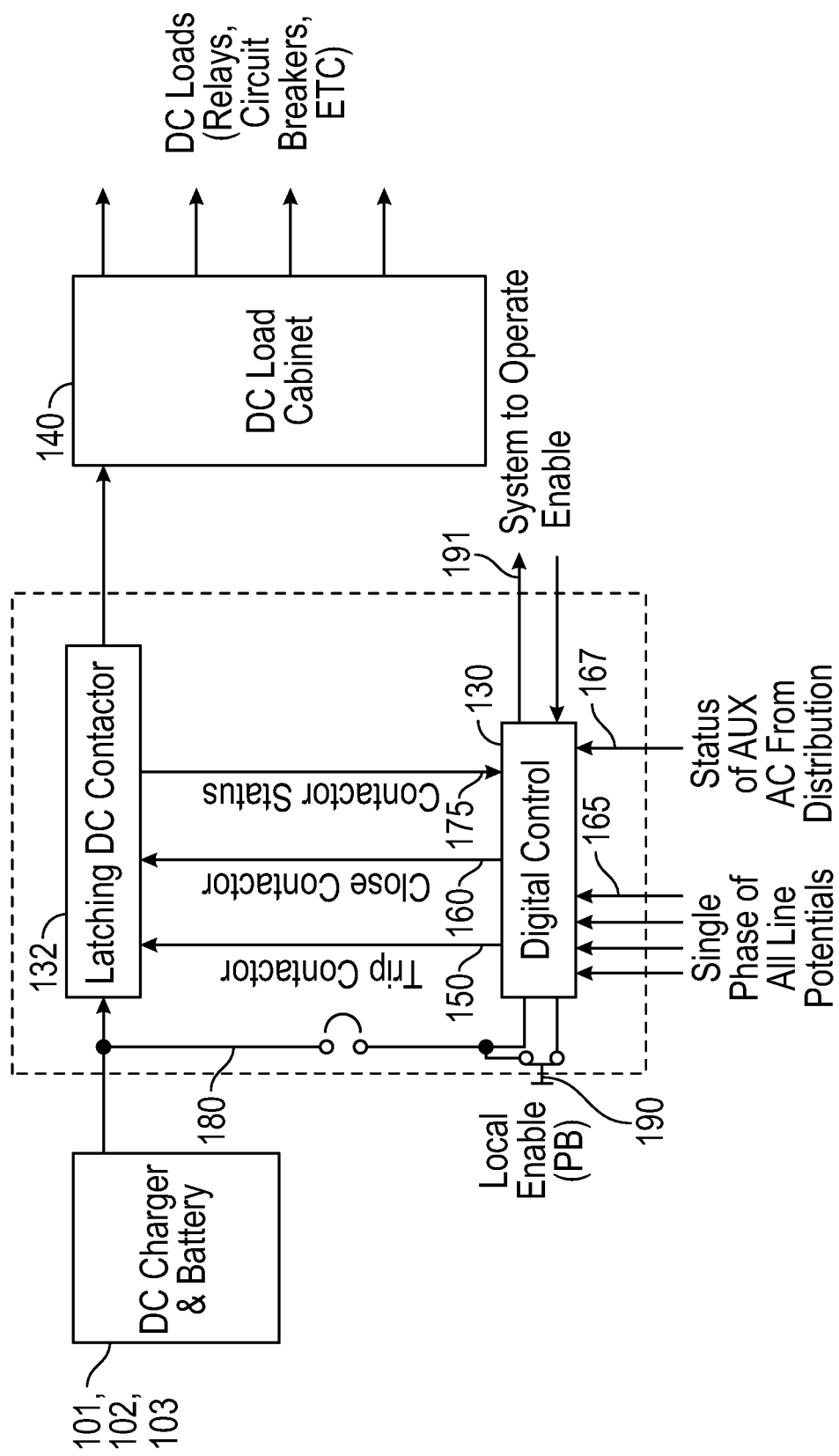
FIG. 3 shows the hardware layout of the battery extender, including its digital controller and latching DC contactor.

FIG. 3 shows the hardware layout of the battery extender, including its digital controller 130 and latching DC contactor 132. This system consists of a latching DC contactor 132, positioned to isolate the DC load cabinet (or panel) 140 from the battery 103 and charger 101, 102, and the digital controller that controls the contactor. The contactor must hold its position in the open position and the closed position, even after the coil that activated it into that position is de-energized. Latching contactors can be of the dual coil variety, where they have a separate trip and close coil for which a momentary DC applied to either will cause the contactor to operate or they can be of the single coil variety, where applying momentary voltages of opposite polarity causes the contactor to open or close. This prevents a constant signal from being needed for either coil, which would need to be supplied by the station battery and reduce the duty cycle duration of the system. The digital controller provides a trip 150 and close 160 signals to the latching contactor, along with an external binary alert that the system is about to operate. The digital controller takes in a single phase of voltage from all lines 165 and branches into the station the status of auxiliary AC 167 supplied from local distribution, the open/close status of the latching contactor, a local enable 190 that allows a push button to enable or disable the system, a "System to Operate" warning 191 that alerts a remote user that the latching contactor is about to open, and an enable trip function 170 that allows a remote user to enable or disable the system. The system includes a DC supply for the digital controller on the battery/charger side of the latching DC contactor, which allows the digital controller to be supplied while all other DC loads are cut off.

Auxiliary AC refers to the standard AC power required to operate substation equipment, including lighting, heating, ventilation, communications equipment, and supervising control and data acquisition (SCADA) equipment. The auxiliary AC power is typically derived from dedicated low voltage sources or from additional circuits on low voltage distribution switch gear. Power lines 165 are generally high or medium voltage lines that are connected, distributed, collected, converted and/or transformed at the substation.

Contactor 132 is operated by a digital system that monitors a single phase of voltage of all supply lines into the station to establish whether the station is alive or dead. If all power lines and auxiliary power are dead, then the station is considered to be dead and therefore all loads in the DC Load Cabinet are not needed. When it is determined that the DC loads are not needed, the latching contactor is tripped, thus removing the load cabinet 140 and its connected loads. This digital system is supplied by a DC connection located between the latching contactor 132 and battery 103. Therefore, it remains active while all other loads are disconnected. When it senses that one of the supply lines into the station is alive, it closes the latching contactor 132, thus restoring relaying, telecommunication, and breaker trip/close functions. Contactor open/close status is fed back to the system to determine whether to open or close the contactor. A local enable signal push button 190 allows the user to activate or deactivate this system, and a "System to Operate" 191 alert can be routed to alert other systems in the substation that the battery extender is going to disconnect the DC load. An "Enable Trip" signal 170 allows a remote user to give the system permission to operate once a "System to Operate" warning is received. The combination of "System to Operate" alert 191 and "Enable Trip" 170 also provides users the opportunity to pair the battery extender with automated logic within the substation's control systems. This can include, for example, a function to trip all circuit breakers in the substation upon receiving the "System to Operate" alert, and confirming that they are opened before delivering the "Enable Trip" alert. Unless the user chooses to program the function of the SCADA system differently, the battery extender does not require operator intervention to either activate or deactivate.

A contactor status (tripped or closed) signal 175 is provided to the controller. Battery power 180 is supplied to the controller directly from the battery (i.e., upstream of the contactor).

Figure 4:
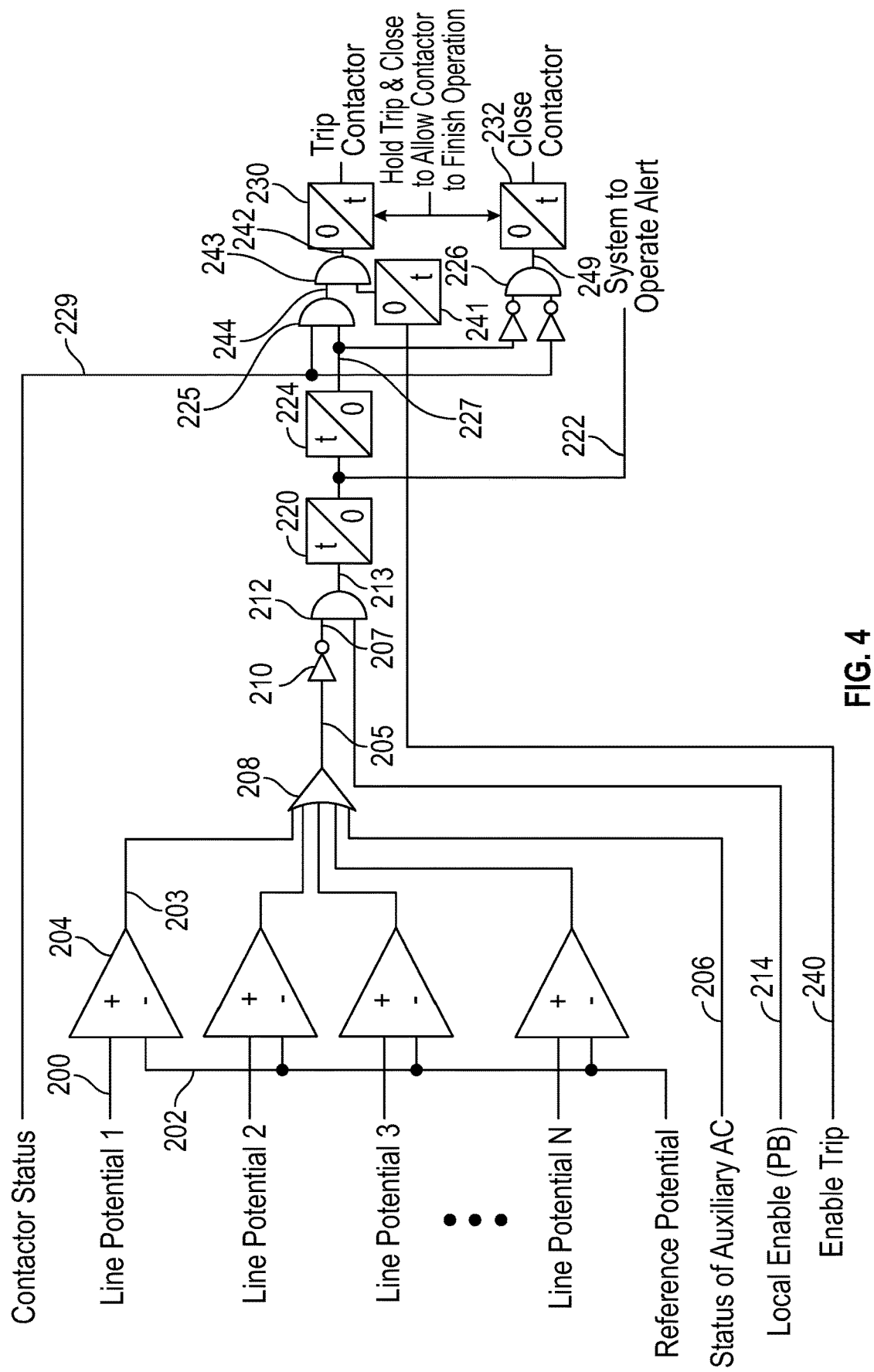
FIG. 4 shows a logic diagram that describes the function of the digital controller.

FIG. 4 shows a logic diagram that describes the function of the digital controller 130. This controller first takes in a single phase of voltage from all lines 200 and branches into the station, and compares the line voltage to a minimum value (reference potential 202) using a binary comparator 204 that outputs a first signal 203 indicative of whether the line inputs are live or dead. Signals 203, along with the status of AC station service 206, are combined through an OR-gate 208 to output a second signal 205 indicative of whether the station is live. Signal 205 is then inverted through NOT-operator 210 to generate a third signal 207 and ANDed at AND-gate 212 with an enable signal 214 which turns the system ON or OFF. The outputted fourth signal 213 is then put into a first timer 220, that introduces a delay to avoid nuisance tripping of the system. The output of the first timer is then sent out as a fifth signal 222 that provides an alert that the battery extender is about to operate, and is also sent into a second timer 224, which introduces a delay. The outputted sixth signal 227 from the second timer is combined at AND-gates 225 and 226 with a signal representing the status 229 of the latching direct current contactor to produce seventh and eighth signals 244 and 249 respectively, which determine whether the contactor should trip (open) or close. AND-gate 243 combines the output of AND-gate 225 (seventh signal 244) with an Enable Trip signal 240 to output a ninth signal 242 which allows a remote user to give the system permission to open the contactor. This Permission to Trip features timer 241, which ensures that permission to trip does not go to zero instantaneously after the contactor interrupts direct current, and therefore the contactor can finish its motion. Finally, timers 230, 232 with only dropout delays are introduced in series with the trip and close contactor outputs to allow the contactor to finish its operation.

Calculations and assumptions can be used to predict how long a substation battery could last with this reduced load mode. The following conservative assumptions were made to predict a minimum expected battery life extension.

It was assumed that the load of the battery extender would be 15 W, which is the power demand of an SEL-2411, a digital device, common to many substations, which can execute this function (though a cheaper, lower power PLC can likely perform this program as well).

It was assumed that this system will operate on a 125V DC system with a 50 Amp-Hour (for an 8-hour discharge) vented lead acid (VLA) battery. 50 Amp-Hours represents the smallest size of a battery typically found in most substations. 100-200 Amp-Hours is a much more typical size for a substation's batteries.

It was assumed that the battery's Amp-Hour capacity was 80% of its original due to aging. VLA batteries lose capacity over time, and this loss increases rapidly when they reach 80% of their installed capacity, so IEEE Standard 485, Recommended Practice for Sizing Lead-Acid Batteries for Stationary Applications, calls for lead acid batteries to be replaced before they decline to 80% of their original capacity.

It was assumed that the battery should only be discharged to depth of discharge of 50%. Depth of discharge refers to the percentage of the rated Amp-Hour capacity that is used for a given battery. Completely discharging the entire capacity of any battery will cause it damage. For both VRLA and vented lead acid batteries, it is generally accepted that depth of discharge should be limited to 50% to avoid a decrease in life.

The effects of Peukert's Law were ignored in this paper's analysis. Peukert's Law consists of a mathematical formula that describes how the effective energy storage capacity of a lead acid battery will increase as its current is drained more slowly. While the effect of Peukert's Law will improve the duration for which the station outage battery extender system can last, the mathematical relationship does not hold at a reduction as substantial as that from typical steady state relay demand (a few Amps) to the 120 mA demand of the 15W PLC assumed for this system.

Self-discharge is ignored because it is not a significant phenomenon in lead acid batteries, which typically self-discharge about 5% of their stored charge in a month.

Using these conservative assumptions, it can be seen that when a 50 Amp-Hour battery is assumed to have degraded to 80% of its original capacity, and when depth of discharge is limited to 50%, this provides an effective capacity of 20 Amp-Hours to supply to the load. Assuming that the battery extender consumes 15 W which equates to 120 mA at 125 Vdc, it can be supplied by this battery for 166.7 hours, which equates to almost 7 days. When the station comes back online, the breakers that have tripped can be closed using the remaining capacity in the battery. They will not be a significant enough drain to damage a battery even at 50% depth of discharge.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

The invention claimed is:

1. A system for extending battery life of at least one battery powering at least one direct current load leads panel or bus at an electrical substation, comprising:
a latching direct current contactor having a direct current input and a direct current output; and
a controller configured to monitor all alternating current inputs to an electrical substation, and to trip the latching direct current contactor when all alternating current inputs and auxiliary power to the electrical substation are dead, whereby direct current does not flow through the latching direct current contactor, and to close the latching direct current contactor when at least one alternating current input or auxiliary power is live, whereby direct current flows through the latching direct current contactor.

2. The system of claim 1, wherein the latching direct current contactor is electrically located between a direct current distribution cabinet and the at least one direct current load panel or bus, and wherein the direct current distribution cabinet is configured to receive direct current from the at least one battery and at least one direct current charger.

3. The system of claim 1, further comprising:
a battery; and
a direct current charger for converting an alternating current input to a direct current for charging the battery and powering at least one direct current load panel or bus.

4. The electrical substation of claim 3, wherein the latching direct current contactor is electrically located between a direct current distribution cabinet and the at least one direct current load panel or bus, and wherein the direct current distribution cabinet receives direct current from the at least one battery and at least one direct current charger.

5. A method of extending the operating life of a battery at an electrical substation having at least one direct current load panel or bus and at least one alternating current input, comprising:
providing the system of claim 1;
connecting the direct current input of the latching direct current contactor to a battery and connecting the direct current output of the latching direct current contactor to at least one direct current load panel or bus, whereby direct current flows through the latching direct current contactor and to the at least one direct current load panel or bus when the latching direct current contactor is closed, and direct current does not flow through the latching direct current contactor to the at least one direct current load panel or bus when all alternating current inputs and auxiliary power to the electrical substation are dead.

6. The method of claim 5, wherein the latching direct current contactor is electrically located between a direct current distribution cabinet and the at least one direct current load panel or bus, and wherein the direct current distribution cabinet receives direct current from the at least one battery and at least one direct current charger.

7. The system of claim 1, wherein the controller comprises:
a comparator associated with a single phase of each alternating current input to the substation, each comparator comparing the single phase of each associated alternating current input to a predetermined threshold value, and providing a first output signal indicating that the alternating current input is live when it exceeds the threshold value or dead when it does not exceed the threshold value;
an OR-gate for receiving and combining the first output signal from each comparator with an auxiliary AC status signal to output a second signal indicating whether all alternating current and auxiliary power inputs are dead or at least one alternating current input or auxiliary power is live;
a NOT-operator to reverse the logic of the second signal and output a third signal;
an AND-gate receiving the third signal from the OR-gate and combining it with a system local enable signal, and producing a fourth signal indicating to trip open the latching direct current contactor when the system is enabled and all alternating current inputs and auxiliary power are dead, or to not trip close the latching direct current contactor when the system is not enabled or at least one alternating current input or auxiliary power is live.

8. The system of claim 7, further comprising a first timer that receives the fourth signal and introduces a first delay and outputs a fifth signal indicating to trip the latching direct current contactor when the fourth signal remains unchanged during the first delay.

9. The system of claim 8, wherein the fifth signal is transmitted to alert a substation operator that the current contactor is about to be tripped, and further comprising a second timer that receives the fifth signal and introduces a second delay, and outputs a sixth signal indicating to trip the latching direct current contactor, and a second AND-gate for receiving a latching direct current contactor status signal and the sixth signal to output a seventh signal to trip the latching direct current contactor when the direct current contactor is closed, and wherein the sixth signal output from the second timer is also inverted and combined in a third AND-gate with an inverted latching direct current contactor status signal to output an eighth signal which instructs the latching direct current contactor to close.

10. The system of claim 9, further comprising a third timer that receives an Enable Trip signal and introduces a dropout delay before combining with the seventh signal in a fourth AND-gate to produce a ninth signal.

11. The system of claim 10, wherein the ninth signal is put into a fifth timer with a dropout delay, to ensure that the trip signal is available to the latching direct current contactor long enough for it to complete its operation, and wherein output of the fifth timer produces a signal which is fed to the latching direct current contactor to open it.

\* \* \* \* \*

UNITED STATES PATENT AND TRADEMARK OFFICE
CERTIFICATE OF CORRECTION

| | | |
|---|---|---|
| PATENT NO. | : 12,088,132 B2 | Page 1 of 1 |
| APPLICATION NO. | : 17/878553 | |
| DATED | : September 10, 2024 | |
| INVENTOR(S) | : Gerald Robert Callison and Sebastien Christophe Billaut | |

It is certified that error appears in the above-identified patent and that said Letters Patent is hereby corrected as shown below:

In the Claims

Claim 1, Line 31, remove the word "leads"
Claim 5, Line 67, remove ";"

Signed and Sealed this
Fifteenth Day of October, 2024

Katherine Kelly Vidal
*Director of the United States Patent and Trademark Office*